United States Patent [19]

Wyatt et al.

[11] 4,123,482

[45] Oct. 31, 1978

[54] MECHANICAL AERATOR

[75] Inventors: Kenneth L. Wyatt, Oswestry; Keith J. Ilett, Crewe, both of England

[73] Assignee: Air Products & Chemicals, Inc., Allentown, Pa.

[21] Appl. No.: 813,593

[22] Filed: Jul. 7, 1977

[30] Foreign Application Priority Data

Jul. 8, 1976 [GB] United Kingdom ............... 28453/76

[51] Int. Cl.$^2$ ............................................. B01F 3/04
[52] U.S. Cl. ...................................... 261/91; 210/219; 210/242 A; 416/188; 416/237
[58] Field of Search ................... 210/14, 15, 208, 219, 210/221 M, 242 A; 261/91; 416/188, 237

[56] References Cited

U.S. PATENT DOCUMENTS

| 3,182,972 | 5/1965 | Alsop et al. ........................... 261/91 |
| 3,241,820 | 3/1966 | Clough .................................... 261/91 |
| 3,606,984 | 9/1971 | Robertson ............................. 210/219 |

FOREIGN PATENT DOCUMENTS

| 46-3,554 | 1/1971 | Japan ......................................... 261/91 |
| 1,387,924 | 3/1975 | United Kingdom ....................... 261/91 |
| 422,692 | 12/1971 | U.S.S.R. .................................... 210/219 |

Primary Examiner—Charles N. Hart
Assistant Examiner—Peter A. Hruskoci
Attorney, Agent, or Firm—Ronald B. Sherer; Barry Moyerman

[57] ABSTRACT

A mechanical aerator comprising a boss, and at least one blade which extends radially from the boss and comprises a planar body portion and a deflector, the arrangement being such that when the aerator is mounted for rotation about a vertical axis the planar body portion of the blade lies in a vertical, or substantially vertical, plane and the deflector is inclined circumferentially upwardly from the top of the planar body portion.

3 Claims, 4 Drawing Figures

MECHANICAL AERATOR

BACKGROUND OF INVENTION

FIGS. 1 and 2 of the accompanying drawings show a side view and a plan view of a well known aerator 1. The aerator 1 comprises four planar blades 2, 3, 4 and 5 which are secured to a cone-shaped boss 6. The diameter of such an aerator is typically 28 inches to 120 inches. In use, the boss 6 is secured to the drive shaft of a motor and the aerator is rotated in liquid, for example waste liquor at typically 25 to 120 r.p.m.

One of the disadvantages of this type of aerator is that under certain conditions the aerator produces excessive random quantities of extremely small droplets that could splash the aerator supporting bridge and adjacent structures. This is generally undesirable since the production of such extremely small droplets consumes a substantial amount of energy which is not rewarded with a commensurate increase in the air/liquid interface. In addition, excessive free board is required at increased installation costs.

Our observations have indicated that these excessive quantities of extremely small droplets are caused by droplets of water being thrown in the air by one blade, e.g. blade 2, and being hit by the next blade, e.g. blade 3, before they return to the liquid.

An object of at least preferred embodiments of the present invention is to provide an aerator which will produce less extremely small and random droplets than are produced by the aerator shown in FIGS. 1 and 2.

A further object of at least preferred embodiments of the present invention is to provide a mechanical aerator with low surging characteristics thereby enhancing the flow of liquid in the aeration vessel.

A still further object of at least preferred embodiments of the present invention is to provide a mechanical aerator which will not readily become covered in rags and similar items which are frequently found in waste water.

Another object of at least preferred embodiments of the present invention is to provide a mechanical aerator which, whilst being extremely simple and inexpensive to construct, has a high oxygenation efficiency.

SUMMARY OF INVENTION

According to the present invention, there is provided a mechanical aerator which comprises a boss, and at least one blade which extends radially from said boss and comprises a planar body portion and a deflector, the arrangement being such that when the aerator is mounted for rotation about a vertical axis the planar body portion of said blade lies in a vertical, or substantially vertical, plane and the deflector is inclined circumferentially upwardly from the top of said planar body portion.

The mechanical aerator preferably comprises 2 to 8 blades and advantageously four blades which are equally spaced around the boss.

The deflector is preferably tapered towards the boss and is preferably planar.

The planar body portion and the deflector may be formed by cutting and bending a single sheet of material. Alternatively they may comprise two separate and distinct units which are welded or otherwise fastened together.

When the deflector is planar, the angle between the deflector and the planar body portion is preferably between 100° and 150°, and more preferably between 110° and 130° and advantageously 120°.

The present invention also provides a method of aerating liquid which method comprises the steps of rotating a mechanical aerator in accordance with the invention in liquid.

The aerator in preferably rotated so that the deflectors extend upwardly and away from the direction of rotation of the aerator.

DETAILED DESCRIPTION

For a better understanding of the present invention reference will now be made, by way of example, to FIGS. 3 and 4 of the accompanying drawings, in which.

Figure 3:
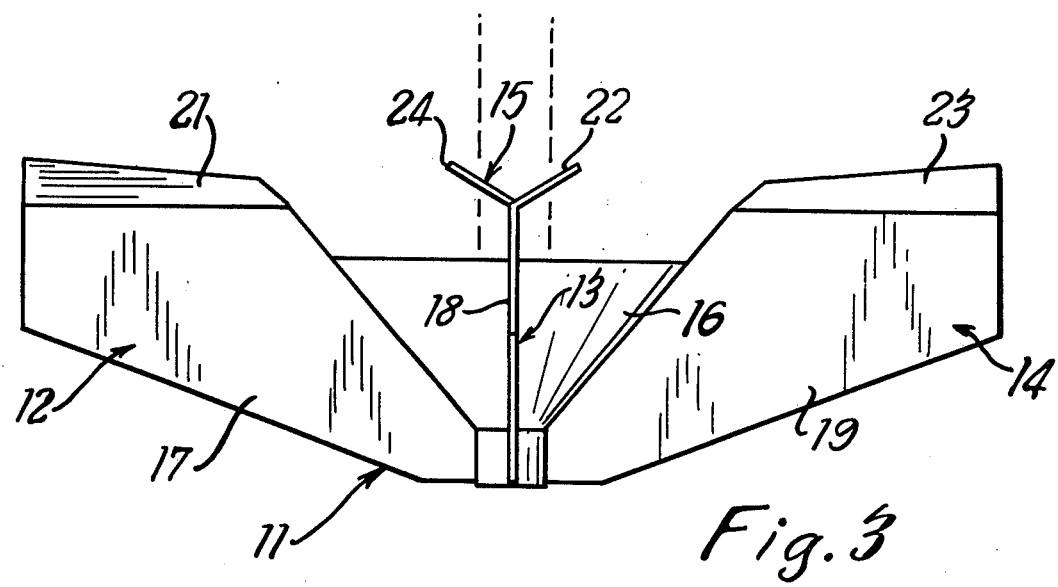
FIG. 3 is a side elevation of an aerator in accordance with the invention.
Figure 4:
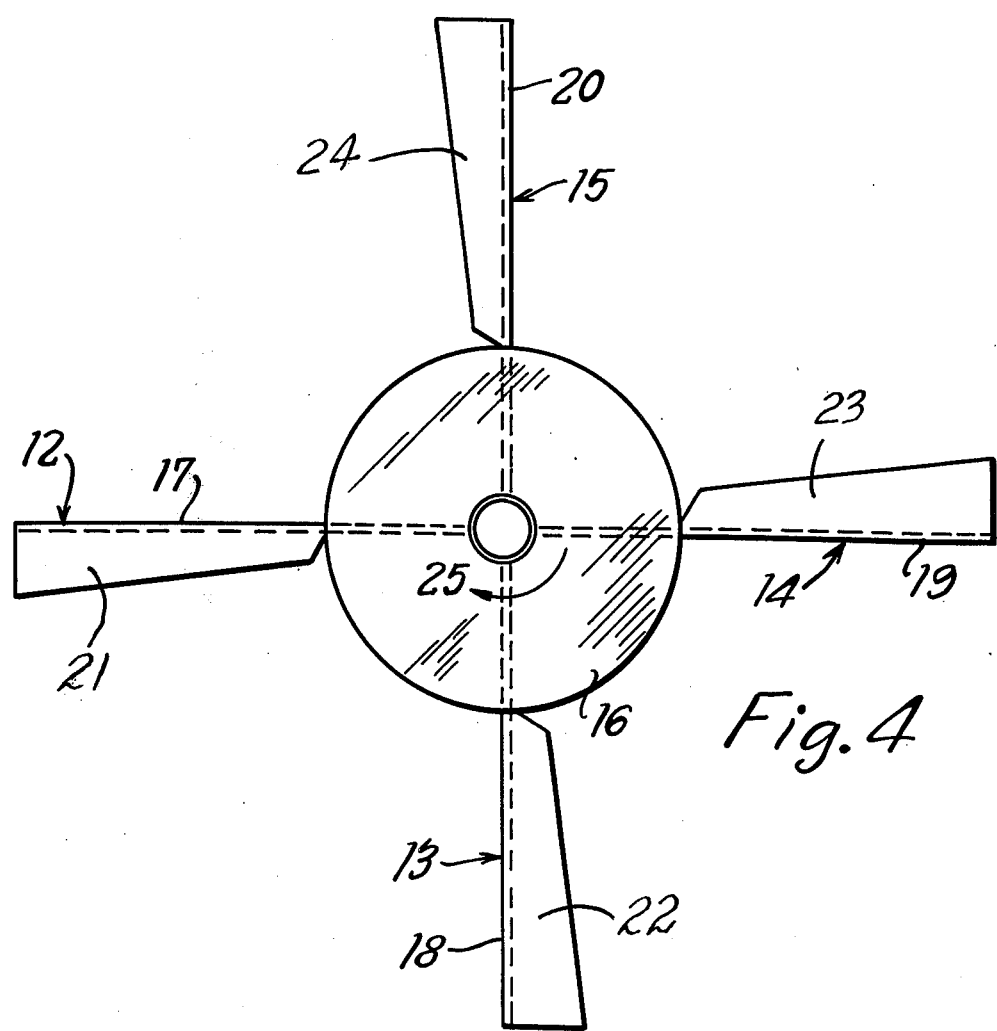
FIG. 4 is a top plan view of the aerator shown in FIG. 3.

Referring to FIGS. 3 and 4 of the drawings, there is shown a mechanical aerator which is generally identified by reference numeral 11. The aerator 11 comprises four blades 12, 13, 14 and 15 which extend radially from and are secured to a boss 16.

Each blade 12, 13, 14 and 15 comprises a vertical body portion 17, 18, 19 and 20 respectively and a deflector 21, 22, 23 and 24 respectively. It will be seen that each deflector is inclined upwardly from the top of its associated vertical body portion and that the angle between the deflector and the vertical body portion is 120°.

As better shown in FIG. 4, each of the deflectors 21, 22, 23 and 24 tapers towards the boss 16.

In use, the boss 16 is secured to the vertical drive shaft of a motor (not shown). The aerator 11 is then immersed in liquor to a maximum level close to the top of the boss 16 in FIG. 3. The motor is then actuated and the aerator 11 is rotated in the direction of the arrow 25 (FIG. 4) so that the deflectors extend rearwardly relative to the direction of rotation.

Our observations have shown that the deflectors considerably reduce the amount of extremely small particles formed above the aerator and hence improve the efficiency of the aerator for a given power consumption and reduce splash nuisance.

Figure 1:
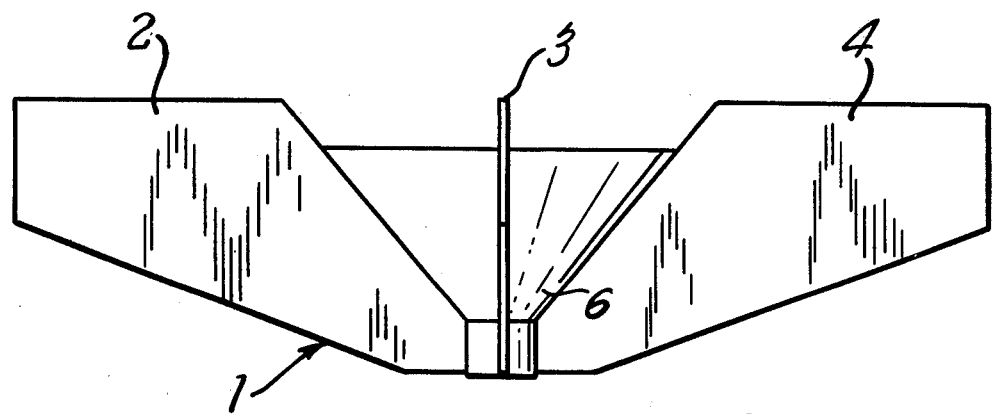
Figure 2:
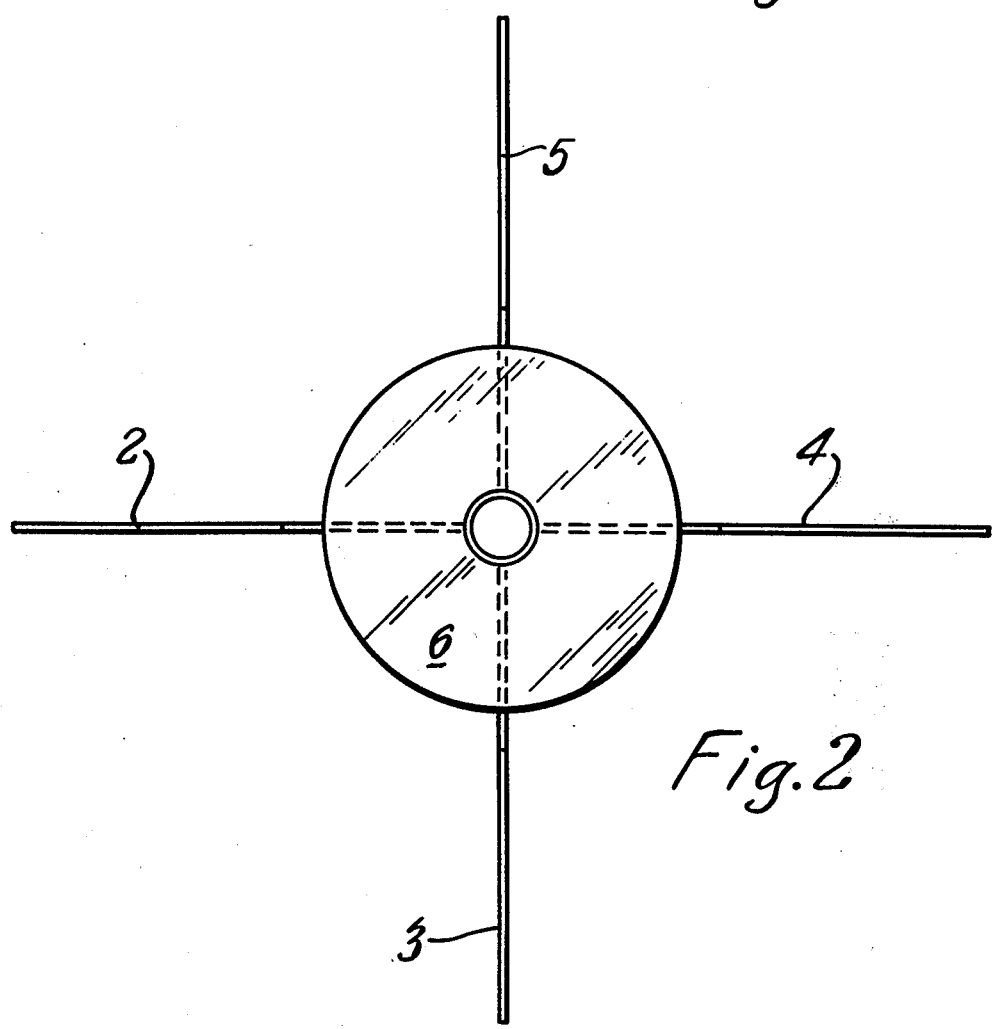

In addition the mechanical aerator described with reference to FIGS. 3 and 4 has less tendency to surge than the mechanical aerator shown in FIGS. 1 and 2. Surging is caused by the vortex which forms under the rotating aerator periodically collapsing. This disrupts the flow of liquid in the aeration vessel and is generally undesirable.

The mechanical aerator described with reference to FIGS. 3 and 4 does not readily become covered in rags and similar items which are frequently found in waste water.

A test was carried out by the Water Research Council to determine the aeration performance of the mechanical aerator shown in FIGS. 3 and 4. The tests were carried out in a steel tank 24 ft. square and 12 ft. deep.

The mechanical aerator had a radius of 805 mm and the total depth of the vertical body blade was 439 mm.

The mechanical aerator was considered to have zero freeboard when the mechanical aerator was so positioned that, when stationary, the level of water in the tank coincided with the top of the boss 16.

At the start of the programme of tests the tank was filled with fresh tap water to a depth of 3.03 m. Two calibrated dissolved-oxygen electrodes were installed.

One was placed about 1 m below the surface and midway along one side, while the other was positioned approximately 1.5 m below the surface of the water and 1 m from each of two adjacent vertical sides of the tank. The latter electrode was connected to a potentiometric recorder to allow the concentration of dissolved oxygen in the water to be recorded continuously during each test.

Immediately before the start of each test a strong solution of sodium sulphite was added to the water in a quantity sufficient to reduce the concentration of dissolved oxygen to zero. A measured quantity of a strong solution of cobalt chloride was also added to give approximately 0.5 mg cobalt per liter of water in order to catalyse the de-oxygenation reaction. To ensure thorough mixing and uniformity of composition of the contents of the tank, the aerator was run for a number of minutes before measurement of the concentration of dissolved oxygen was started. The increase in concentration of dissolved oxygen in the de-oxygenated water was observed using the electrode connected to the potentiometric recorder and was also noted at frequent intervals from the reading on the indicating meter of the other electrode. Operation of the aerator was continued until the concentration of dissolved oxygen, as indicated by both electrodes, reached a maximum value. The power consumed by the mechanical aerator and the speed of rotation of the mechanical aerator were noted at intervals during each test.

The temperature of the water, to the nearest 0.05° C, and the barometric pressure, to the nearest millimeter of mercury, were noted at the beginning and end of each period of aeration.

In all, six separate tests were carried out at different depths of immersion (freeboard) of the mechanical aerator.

The conditions of each experiment and the results calculated from data obtained are shown in Table 1.

Table 1.

Conditions of tests and results obtained when aerating fresh tap water with a four-bladed surface aerator at various depths of immersion. Concentrations of dissolved oxygen in the water undergoing aeration were determined.

| Freeboard of aerator (mm) | Temperature of water (° C) | Volume of water (m³) | Power applied to aerator shaft (kW) | Overall oxygen-transfer coefficient as determined ($h^{-1}$) | Average overall oxygen-transfer coefficient at 20° C ($h^{-1}$) | Oxygenation capacity (kg/h) | Oxygenation efficiency (kg/kW) |
|---|---|---|---|---|---|---|---|
| Zero | 6.0 | 162.4 | 7.47 | 9.82 | 13.77 | (a) 20.3 (b) 19.8 | 2.72 |
| 50 | 6.05 | 159.7 | 6.38 | 8.94 | 12.53 | (a) 18.2 (b) 17.9 | 2.85 |
| 100 | 6.9 | 157.0 | 6.11 | 9.51 | 13.10 | (a) 18.7 (b) 18.8 | 3.06 |
| 150 | 7.0 | 154.3 | 5.00 | 8.19 | 11.25 | (a) 15.8 (b) 16.0 | 3.15 |
| 200 | 7.2 | 151.6 | 3.72 | 6.86 | 9.38 | (a) 12.9 (b) 12.8 | 3.47 |
| 250 | 7.3 | 149.0 | 1.89 | 2.7 | 3.68 | (a) 5.0 (b) 5.0 | 2.63 |

(a) continuously, using a dissolved-oxygen electrode connected to a recorder
(b) intermittently by reading the scale of an indicating meter of a dissolved-oxygen electrode Overall oxygen-transfer coefficients were calculated using separately the data obtained from each oxygen electrode. It can be seen from Table 1 that in each test values of the oxygenation capacity obtained independently from data from each of the oxygen electrodes agree very closely, being well within the normal limits of experimental error. The value of the oxygenation capacity, as determined by the potentiometric recorder has been used for calculating the oxygenation efficiency achieved in each test.

What is claimed is:

1. A mechanical aerator comprising a boss secured to a vertical drive shaft and a plurality of blades secured to said boss, said boss having a vertical axis of rotation, each of said blades extending radially from said axis of rotation and having a body portion and a deflector portion, said body portions being planar and extending in substantially the vertical plane, said deflector portions of said blades being planar and extending from the upper edge of said blade portions upwardly and rearwardly relative to the direction of rotation about said axis wherein the angle between the body portions and the deflector portions is in the range of 100° to 150°.

2. The mechanical aerator as claimed in claim 1 wherein said deflector portions taper in the direction towards said boss.

3. The mechanical aerator as claimed in claim 1 wherein the angle between the deflector portions and the body portions is in the range of 110° to 130°.

* * * * *